No. 826,981. PATENTED JULY 24, 1906.
J. WILKINSON.
VALVE MECHANISM.
APPLICATION FILED SEPT. 23, 1905.
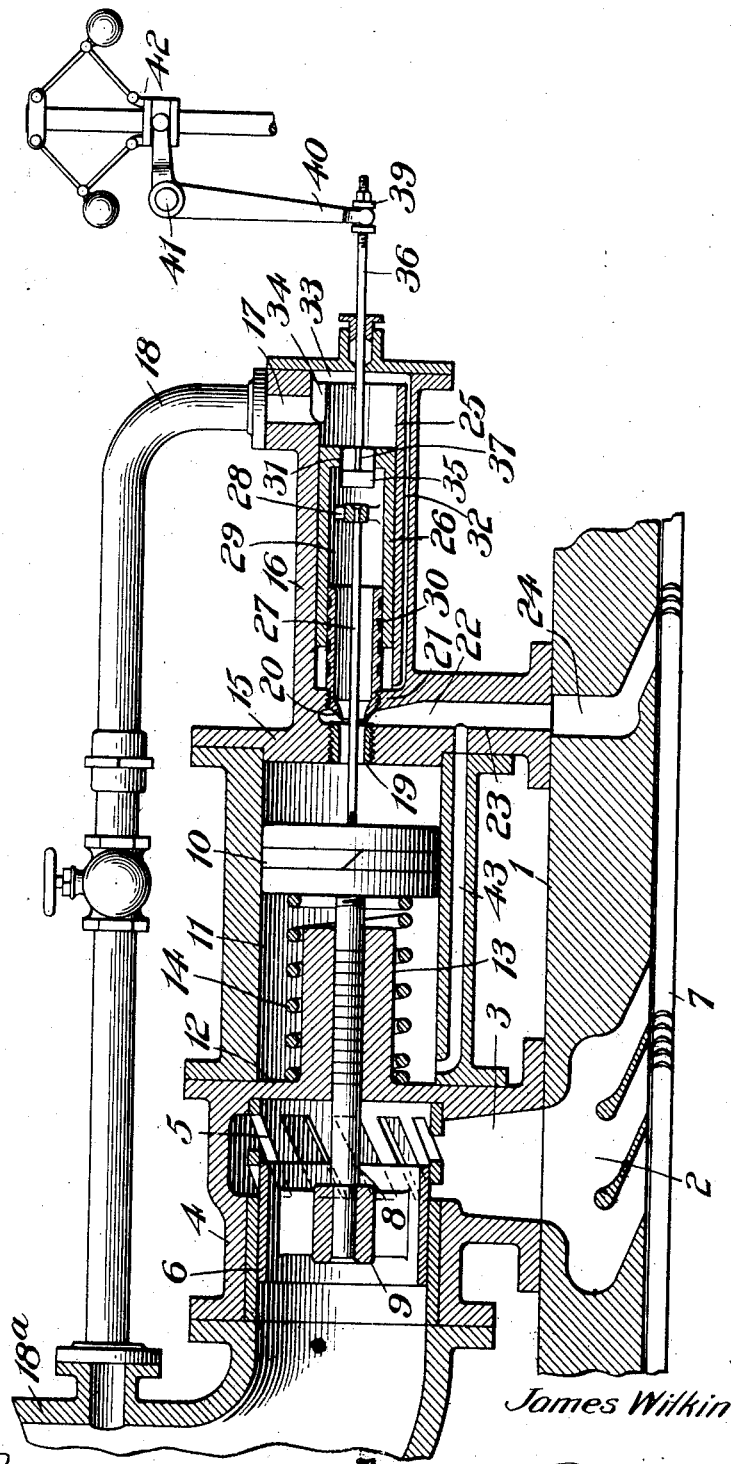
Witnesses
Edwin L. Bradford
J. R. Nottingham
Inventor
James Wilkinson
Attorney

UNITED STATES PATENT OFFICE.

JAMES WILKINSON, OF PROVIDENCE, RHODE ISLAND, ASSIGNOR TO WILKINSON TURBINE COMPANY, A CORPORATION OF ALABAMA.

VALVE MECHANISM.

No. 826,981.        Specification of Letters Patent.        Patented July 24, 1906.

Application filed September 23, 1905. Serial No. 279,810.

*To all whom it may concern:*

Be it known that I, JAMES WILKINSON, a citizen of the United States, residing at Providence, in the county of Providence and State of Rhode Island, have invented new and useful Improvements in Valve Mechanism, of which the following is a specification.

My invention relates to improvements in valve-controller mechanism of a class where a governor-controlled relay-valve regulates an actuating fluid-pressure for an engine-valve.

My invention is particularly adapted for use with a turbine as the valve and its controller mechanism may be so arranged that the fluid-pressures respectively controlled by each are discharged directly into the turbine; but my invention is not limited to such use.

Where it is desired to regulate a motor by one or more valves designed to operate with intermediate positions under the control of a speed device, the best results are obtained when it or they can be caused to move gradually and positively and stand without hunting at the critical point where steam will be supplied in direct proportion to the load.

One object of my invention is to adapt the valve to move gradually and positively and to definitely stand at the critical point where it admits steam proportioned to the load. I obtain this effect by providing a controllable valve-actuating power and a variable resistance counteracting it and adapting the valve itself to be operated by the power or resistance and as it moves to influence the actuating power, causing it to counterbalance the resistance when the valve reaches a critical point of control. In other words, the governor and the engine-valve coöperate in producing a definite actuating power for the latter in each of its operating positions, and it is only necessary to provide a resistance which will counterbalance that power at any point in the valve's travel responsive to the governor's action to obtain the desired valve control. Such being broadly the purpose of my invention, I propose to carry it into effect in a variety of different ways, my preferred construction embodying a motor-cylinder whose piston is connected to the main valve and to the seat for the controller-valve, which latter under the control of a governor acts to throttle the pressure-supply to a jet-nozzle which discharges with variable-impact effect into one end of the cylinder. The different actuating-pressures thus obtained are counteracted by a variable resistance, such as a spring, which causes the piston to come to rest between equal pressures at any intermediate point determinable by the governor. Variable resistances such as are described in other pending applications, Serial Nos. 268,203 and 277,349, may be substituted for the spring. The action of a throttled jet-controller stream is fully set forth in said applications, which are devoted to that point.

My invention further comprises improvements in the details of construction and arrangement of parts hereinafter more particularly described, and pointed out in the appended claims.

According to the drawing, in which I have illustrated my invention in vertical longitudinal section as applied to an elastic-fluid turbine, 1 indicates the supply-head of the turbine-motor, provided with a nozzle-passage 2, which connects with the outlet-port 3 of a valve-casing 4, which in turn is connected with the steam-supply pipe or other source of fluid under pressure. The motor fluid enters the nozzle through the ports in a grated shell 5 under the control of a slide-valve 6 and is discharged against the buckets of a rotatable bucket-supporting element, such as wheel 7. The shell 5 is inserted in the valve-casing 4 in any desired manner. The casing is adapted to be connected to the turbine-head. A stem 8 is connected at one end to a spider 9 in the valve 6 and projects through the right-hand end of the valve-casing, its other end being connected to a piston 10, disposed within a cylinder 11, which preferably abuts against and has its left-hand head formed by the end 12 of the valve-casing, through which the stem 8 passes. This end 12 of the valve-casing is provided with a shouldered extension 13, through which the stem 8 projects and which is disposed for a considerable distance into the cylinder 11. This extension 13 is provided only for the purpose of furnishing an efficient stuffing-box for the stem 8, which is provided with suitable packing devices, such as water-packing grooves, within its portion normally disposed within the extension 13, which prevent the leakage of the high pressure from the valve-casing into the motor-cylinder 11. A spring 14 is disposed around the extension 13 and between the piston 10 and the head 12. This spring acts with increasing tension as a variable resistance to oppose the movement of the piston as it opens the valve 6, its tendency being always to move the valve to its closed position. The piston 10 is packed so as to render it substantially pressure-tight within the cylinder 11. The head 15 is connected to the right-hand end of the cylinder in any suitable manner and has connected thereto or, as illustrated, integral therewith a casing 16, which connects at its outer end through a port 17 and pipe 18 with the motor-fluid-supply pipe 18ª. A bush 19 is threaded into a central opening in the head 15 and forms an induction-port with rounded entrance disposed opposite to and in alinement with a jet-nozzle 20, threaded into a partition-wall 21 of casing 16. The nozzle projects into a chamber 22, formed between this partition-wall and the head 15 and communicating at its lower end through a passage 23 with a nozzle-passage 24, also adapted to discharge pressure against the bucket-bearing element 7. The cylinder 25, formed in the casing 16, is preferably cylindrical and contains a movable shell 26, connected to the piston 10 by a rod 27, which passes centrally through the bush 19 and nozzle 20. The rod 27 is connected to a spider 28, disposed near the right-hand end of the chamber 29, formed in the shell. The left-hand end of the shell surrounds the cylindrical packing-gland 30, which may be formed integral with the jet-nozzle and secured to the wall 21 by the engaging threads of the nozzle or in any other desirable manner. Suitable packing is provided between this extension 30 and the walls of the chamber 29 to prevent the entrance of pressure to said chamber except through a port 31 at its right-hand end. To substantially balance the casing against the pressure in the chamber 25, I provide an equalizing-passage 32, leading from a channel 33 in the right-hand end of the chamber 25 to the left-hand end of that chamber. This passage may be formed in the casing or by pipe connections. A groove 34 in the casing leads from the lower end of the port 17 to the channel 33 in the adjacent cylinder-head, the purpose of this being to maintain the pressure in the right-hand end of the cylinder and in passage 32, so that the casing 26 will not valve it off as it is moved to the full extent of its travel to the right.

The fluid-pressure within the chamber 25 will have a tendency to flow through opening 31 and through the chamber 29 and be discharged at high velocity through the nozzle 20 into the right-hand end of the cylinder 11 through the induction-port in the bush 19. The impact effect of fluid flowing through the induction-port into the cylinder will raise the pressure therein until it is approximately that of the pressure in chamber 29, the fluid after exerting its impact effect flowing through the chamber 22 and passage 23 to the nozzle 24 or to other points for useful service. It will be noted, however, that the nozzle and induction-port being stationary there will be no variation of the controller-pressure in the cylinder, as the impact effect would be of constant value. To vary this impact action of the jet and accordingly to raise or lower the potential of the controller-pressure in the cylinder, I provide a valve 35, operated by a stem 36 and adapted to control or throttle the flow of fluid-pressure from chamber 25 through the port 31 to the nozzle 20. The valve is shown disposed within the chamber 29 and provided with guides 37, disposed within the port 31. The stem 36 passes through a stuffing-gland in the right-hand end of the casing 16 and is provided with a cross-head 39, adapted to be engaged by an arm 40 of the bell-crank lever pivoted at 41 and operatively connected to a speed-responsive device, such as a centrifugal governor 42. The governor may derive its motion from the turbine.

I provide a passage 43, leading from the chamber 22 to the left-hand end of the cylinder 11, for the purpose of providing a resistance or pressure against the piston 10, which in conjunction with the effect of the high pressure in the valve-casing against stem 8 will largely counteract the action of the controller fluid-pressure, leaving the spring 14 comparatively light work.

In operation as the load rises of falls the governor shifts the relay-valve 35 to the left or right, causing a variation in the action of the jet, which produces pressures against the piston 10, that causes it to adjust the valve 6 to deliver the requisite volume of motor fluid. As the valve 6 moves it shifts the seat for the relay-valve, so as to give an antihunting effect, which steadies its movements, causing it to move positively in accordance with the relay-valve and hold itself in any desired position.

What I claim is—

1. In a controlling mechanism for turbines, the combination of a supply-valve for the motor fluid, a governor, a jet of fluid-pressure controlled by said governor and adapted to move said valve in one direction, a resistance opposing the action of said jet, and valving means operating on the fluid-supply for the jet and connected up with said supply-valve so that they move simultaneously.

2. The combination, in a valve-controlling mechanism, of a piston-operated valve, a controllable fluid-pressure acting to move said piston in one direction, a resistance opposing the action of said pressure, governor-controlled means and piston-controlled means which coact to valve the supply and regulate the potential of said piston-actuating pressure.

3. The combination, in a valve-controlling mechanism, of a piston-operated valve, a controllable fluid-pressure for moving said valve in one direction, a resistance opposing the action of said pressure, a speed-responsive device, a valve controlled thereby to throttle the supply of fluid-pressure which actuates said piston, and means operated by said piston which varies the effect of said controller device upon said pressure.

4. The combination, in a valve-controlling mechanism, of a valve, a piston operatively connected thereto and disposed within a cylinder, a controllable power means comprising a governor-controlled fluid-jet to move said piston in one direction, a resistance opposing the action of said jet, and valving means controlled by the movement of the piston to vary the impact effect of the said jet, substantially as described.

5. In a valve-controlling mechanism, the combination of a valve, a piston operatively connected thereto and disposed within a cylinder, a fluid-jet discharging with impact effect to create pressure in one end of said piston, a resistance opposing the action of said pressure upon said piston, a speed-responsive device, means controlled thereby to vary the impact effect of said jet, and valving means controlled by the movement of the piston to influence the potential of the said piston-operating pressure.

6. In a controlling mechanism for turbines, a nozzle-passage, a throttling-valve for said passage, a piston connected to said valve, a spring acting on said piston to close the valve, a cylinder for said piston, a jet of fluid creating fluid-pressure in said cylinder which acts to open said valve, and valving means operating on the fluid-supply to said jet and operably connected to said piston.

7. In a valve-controlling mechanism, the combination of a fluid-motor, a piston therefor, a governor-controlled valve regulating the admission of pressure to said motor, a movable seat for said valve, and an engine supply-valve, said supply-valve and valve-seat being operatively connected to said piston, as and for the purposes described.

8. In a valve-controlling mechanism, the combination of a piston-operated valve, a jet of fluid which acts to move said valve, a governor-controlled valve for varying the volume of said jet, and a movable seat for said latter valve operatively connected to said piston.

9. In a valve-controlling mechanism, the combination of a main valve, a stem connected thereto and to a piston, a cylinder for said piston, a variable resistance opposing the movement of said piston in one direction, a fluid-jet creating an impact pressure to move said piston in the opposite direction, a governor-controlled valve to throttle said jet, and means movable with said piston for coöperating with said governor-valve in regulating said jet.

10. In a valve-controlling mechanism, the combination of a main valve, a fluid-motor for operating said valve which comprises a piston, operatively connected to said valve, and a cylinder, a jet-nozzle adapted to discharge a fluid stream into one end of said cylinder, governor-controlled means to vary the action of said jet, means to conduct said jet-pressure on both sides of said piston, and a spring to coöperate with said pressure in moving said piston against said jet.

11. In a valve-controlling mechanism, the combination of a main valve, a casing therefor, a stem connected to said valve and to a piston, a cylinder for said piston adjacent to said valve-casing, means to pack said stem to prevent leakage into and out of said cylinder, a port at one end of said cylinder, a chamber into which said port opens, a jet-nozzle entering said chamber and adapted to discharge into said cylinder-port, a stem connected to said piston and projecting through said nozzle-opening, an adjustable valve-seat connected to said stem, and a governor-controlled valve which regulates the admission of pressure through said valve-seat to said jet-nozzle.

12. A valve-controlling mechanism comprising a valve, a stationary jet-nozzle leading from a pressure-chamber and adapted to discharge a stream of fluid to control the movement of a valve, a movable partition in said pressure-chamber, means connecting said partition to said valve, a port in said partition through which pressure is supplied to said nozzle, a valve controlling said port, and a speed-responsive device controlling the movements of said valve.

13. In an elastic-fluid turbine, a valve-controller mechanism comprising a fluid-motor cylinder having a port at one end, a valve-controlling piston in said cylinder, a controller-pressure chamber arranged end to end with said cylinder, and a jet-nozzle adapted to discharge a stream of fluid through said port in the cylinder in the direction of the movement of the piston, substantially as described.

14. In a controller mechanism for a turbine, the combination of a valve-casing, a valve therefor, a nozzle-passage supplied with pressure under the control of said valve, a motor-cylinder disposed in alinement with said casing, a piston in said cylinder connected to said valve, a port at one end of said cylinder, a jet-nozzle adapted to discharge fluid-pressure into said port, an equalizing-passage to conduct said jet-pressure behind said piston, a spring coöperating with said pressure behind said piston to move it against said jet, and means controlled by said piston to vary the effect of said jet when the piston moves.

15. In a valve-controller mechanism, the combination of a valve-casing, a motor-cylinder and a fluid-jet nozzle arranged substantially in alinement and connected together, substantially as described.

16. In a valve-controlling mechanism, the combination of a valve-casing, a motor-cylinder and a fluid-jet nozzle arranged substantially in alinement, a piston in said cylinder, a controller device for said jet, a valve in said casing, and stem disposed on opposite sides of said piston which are respectively connected to said valve and jet-controller device.

17. In a valve-controller mechanism, a valve-casing, a motor-cylinder and a fluid-controller mechanism arranged end to end, a piston in said cylinder, a movable valve-seat in said controller mechanism, a governor-controlled valve coöperating with said valve-seat to throttle the controller-pressure, a main supply-valve in said casing, and stems connecting said piston with said main valve and said valve-seat.

18. In a valve-controller mechanism, a jet-nozzle, a pressure-supply chamber for said nozzle, a ported shell therein, packing means to prevent the admission of pressure to said jet except through a port in said shell, a governor-controlled valve for regulating the admission of pressure to said shell, a device operated under the control of said jet of fluid, and means to operatively connect said device and shell, as and for the purposes described.

19. In a valve-controller mechanism, a jet-nozzle, a pressure-supply chamber for said nozzle, a ported shell therein, packing means to prevent the admission of pressure to said jet except through the port or ports therein, a governor-controlled valve for regulating the flow of pressure to said shell, a device operated under the control of said jet of fluid, means to operatively connect said device and shell, and means, such as an equalizing-passage, to substantially balance said shell in said chamber.

In testimony whereof I have hereunto set my hand in presence of two subscribing witnesses.

JAMES WILKINSON.

Witnesses:
  JOHN J. DEVENISH,
  R. D. JOHNSTON.